United States Patent [19]

Beitinger et al.

[11] Patent Number: 4,678,771

[45] Date of Patent: Jul. 7, 1987

[54] ADSORPTION LAYER

[75] Inventors: Eberhard Beitinger, Stuttgart; Eberhard Gläser, Aichwald, both of Fed. Rep. of Germany

[73] Assignee: Ed. Züblin Aktiengesellschaft, Stuttgart-Möhringen, Fed. Rep. of Germany

[21] Appl. No.: 829,524

[22] Filed: Feb. 13, 1986

[30] Foreign Application Priority Data

Feb. 14, 1985 [DE] Fed. Rep. of Germany ....... 3505076

[51] Int. Cl.⁴ .......................... B01J 20/20; B01J 20/26
[52] U.S. Cl. .................................... 502/402; 502/416; 502/527
[58] Field of Search ............... 502/180, 402, 416, 527; 210/502.1

[56] References Cited

U.S. PATENT DOCUMENTS 4,181,513  1/1980  Fukuda et al. .................. 502/416 X
4,517,308  5/1985  Ehlenz et al. ................... 502/402 X

FOREIGN PATENT DOCUMENTS 57-45342  3/1982  Japan ................................... 502/402

*Primary Examiner*—W. J. Shine
*Attorney, Agent, or Firm*—Becker & Becker, Inc.

[57] ABSTRACT

An adsorption layer for retaining liquid or gaseous organic hydrocarbons prior to such matter reaching a sealing sheet of synthetic material. The adsorption layer includes activated carbon that is incorporated loosely or is bonded to the sealing sheet. Retention of the organic hydrocarbons in the adsorption layer prevents possible diffusion of this matter through the plastic sealing sheet.

16 Claims, 6 Drawing Figures

ADSORPTION LAYER

BACKGROUND OF THE INVENTION

1. Field of the Invention

The present invention relates to an adsorption layer for retaining predominantly organic hydrocarbons that are in a liquid or gaseous phase prior to such matter reaching a sealing sheet of synthetic material, such as is installed in an arrangement for sealing the dump.

2. Description of the Prior Art

Where plastic sealing sheets are used to seal off storage basins, safety tanks, dumps, etc., and where liquid or gaseous organic hydrocarbons are present, such as solvents, fuel, and other matter that is present in the vicinity of the sealing sheet, a partial diffusion of this matter through the plastic sealing sheet takes place. The Federal Institute for Material Testing in Berlin has carried out extensive tests, and has determined values up to about 100 g passage of solvent per day per square meter of sealing sheet. These results were published in research paper number 103 02 208 of the Enviornmental Research Program of the Federal Minister of the Interior in February 1984.

An object of the present invention is to provide an arrangement for retaining the organic hydrocarbons that could diffuse through the plastic sheet prior to this matter reaching the surface of the plastic sheet.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

The adsorption layer of the present invention is characterized primarily by a layer of activated carbon that is disposed, when viewed in the direction of flow of seepage water or other matter that is to be retained, ahead of the plastic sealing sheet. The activated carbon can be powdery material, can be bonded directly to the plastic sheet, or can be spaced from the latter.

It is also possible to incorporate the activated carbon in sheets, with a binder, such as synthetic resin on a polyurethane base, or coal tar, holding the activated carbon particles together.

Further specific features of the present invention will be described in detail subsequently.

DESCRIPTION OF PREFERRED EMBODIMENTS

Figure 1:
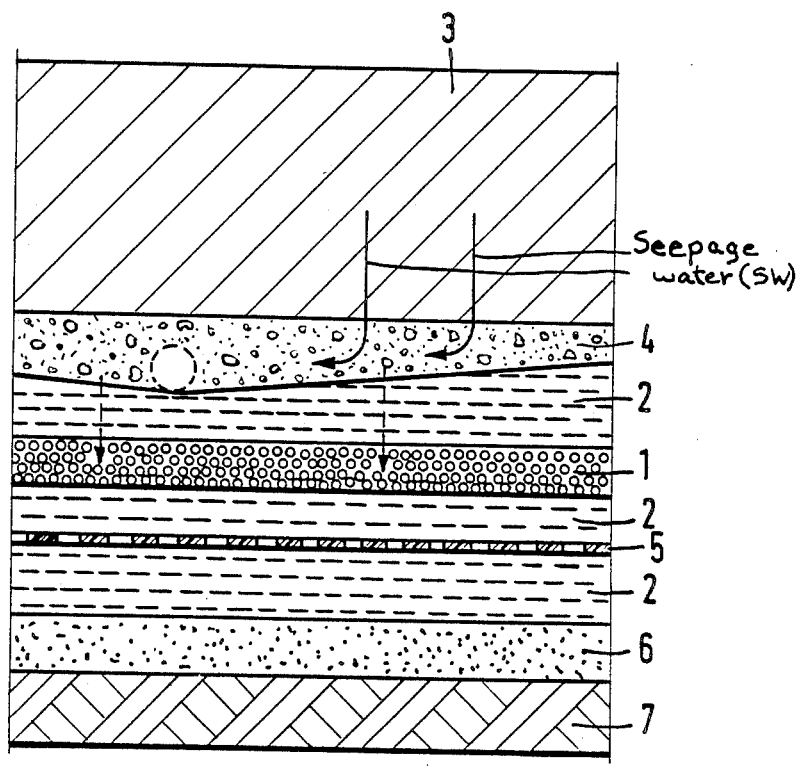
FIG. 1 is a cross-sectional view through a sealing arrangement for the base of a dump, with sealing being provided via a sheet of plastic.

Referring now to the drawings in detail, the exemplary embodiment of FIG. 1 illustrates the configuration of a sealing arrangement for the base of a dump. Seepage water (SW) escaping from the body of refuse 3 is, to a large extent, collected in the drainage layer 4 disposed therebelow. A layer 1 of activated carbon is integrated in the layer 2 of clay provided as an additional layer above the sealing sheet 5 of synthetic material or plastic. Retained in the layer 1 of activated carbon are prodominantly the organic hydrocarbons that flow in with thc seepage water that enters the layer 2 of clay. The clay layer 2 with the embedded intermediate layer 1 of activated carbon thus assumes a double function. In addition to the ion exchange capacity of the clay layer 2, whereby retention of heavy metal compounds is effected, an adsorption of the organic hydrocarbons is effected in the layer 1 of activated carbon.

Due to the retention of the organic hydrocarbons prior to reaching the sealing sheet 5 of plastic, the latter remains nearly completely impermeable, since no dissolving and diffusion processes can take place. This causes a back-up that largely prevents further advancement of seepage water to the layer 1 of activated carbon, so that loading or charging of the nonregeneratable activated carbon of the layer 1 remains relatively slight.

In the illustrated embodiment, a further layer 2 of clay is disposed below the plastic sealing sheet 5, and an equalizing or compensation layer 6 is disposed above the natural subsoil or foundation 7.

Figure 5:
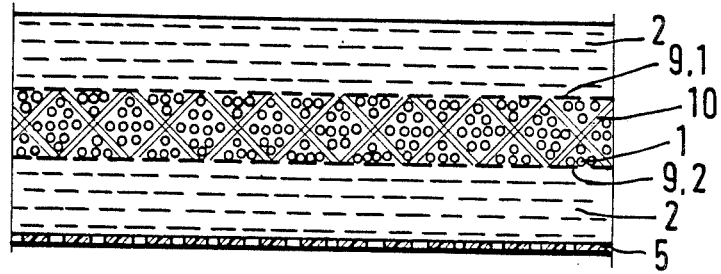
FIG. 5 is a cross-sectional view through an activated carbon layer that is provided with a support grid and filter fleece.
Figure 6:
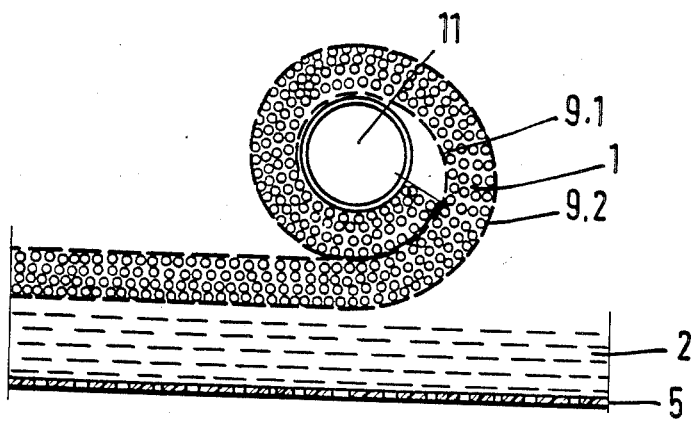
FIG. 6 is a cross-sectional view through an activated carbon layer that is disposed between two filter fleeces, and that has been wound onto a reel.

The activated carbon layer 1 can comprise powdery material, so-called molded carbon having diameters of between 1 and 5 mm, or activated carbon consolidated into sheets. The activated carbon layer 1 can be in the form of molded carbon particles. Pursuant to a further inventive arrangement, the activated carbon 1 can be contained in a carrier material, such as a polyurethane foam. To prevent fine particles from penetrating the activated carbon layer, the latter can be covered on at least one surface by filter fleece for filtering tissue 9.1, 9.2 (FIGS. 5 and 6).

Figure 2:
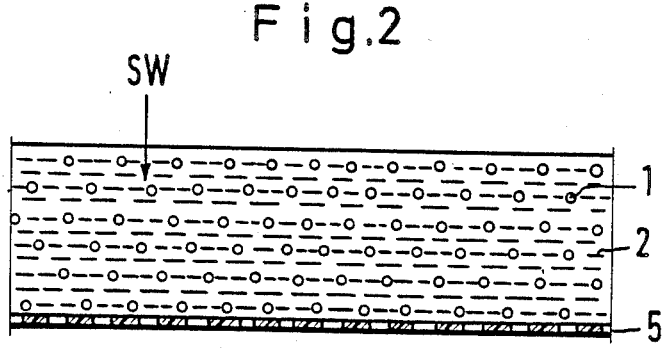
FIG. 2 is a cross-sectional view through a plastic sealing sheet and a clay layer into which has been incorporated activated carbons.

In the embodiment illustrated in FIG. 2, the activated carbon 1 is incorporated in the clay layer 2. This incorporation is effected by mixing the activated carbon particles 1 with the ground clay prior to or during placement of the clay layer 2, resulting in a statistically random distribution of the activated carbon particles in the layer 2 The thus produced clay layer 2 is disposed ahead of the plastic sealing sheet 5 when viewed in the direction of flow of seepage water.

Figure 3:
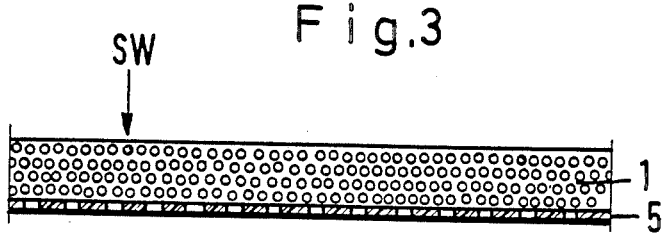
FIG. 3 is a cross-sectional view through a plastic sheet that has been provided with a layer of activated carbon.

As illustrated in the embodiment of FIG. 3, the activated carbon 1 can also be placed directly upon the surface of the plastic sealing sheet 5. The activated carbon can be bonded to the sheet 5, can be loosely placed thereupon, or can be coated thereon.

Figure 4:
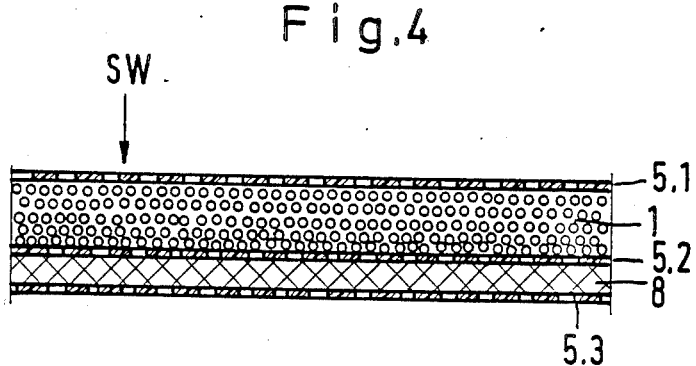
FIG. 4 is a cross-sectional view through a multi-layer sandwich sheet for sealing and adsorption.

In the embodiment illustrated in FIG. 4, the adsorption layer 1 is incorporated in a multilayer sandwich sheet. When viewed in the direction of flow of the seepage water, the sandwich plate has the following composition: A plastic sealing sheet 5.1, a layer 1 of activated carbon, a plastic sealing sheet 5.2, a drainage grate 8, and a further plastic sealing sheet 5.3. The individual layers can be partially or completely bonded to one another, or can be placed loosely one upon the other. The functions of such multi-layer sheets are as follows: Barrier layer, adsorption of the diffused hydrocarbons, barrier layer, control, and barrier layer respectively.

The embodiment of FIG. 5 illustrates an approach that can be used where the rigidity of the activated carbon particles 1 is not sufficient to carry the loads that occur. In this embodiment, a support grid 10 assumes this function. Also illustrated is the possibility of using filter fleeces 9.1 and 9.2 to prevent fine particles from penetrating the layer 1 of activated carbon. This embodiment further illustrates the possibility of incorporating this composite layer, for example as a sheet, in a layer 2 of clay that is disposed above a plastic sealing sheet 5.

As shown in FIG. 6, the activated carbon layer 1 can also be provided in such a way that it can be extended laid open or spread out from a reel 11, again possibly being sandwiched between two filter fleeces 9.1 and 9.2.

The layer 1 of activated carbon advantageously has a thickness of between 5 and 50 cm. If the thickness of the layer is around 50 cm, depending upon the type of activated carbon, up to 50 kg solvent could be concentrated or accumulated per square meter of activated carbon layer.

The present invention is, of course, in no way restricted to the specific disclosure of the specification and drawings, but also encompasses any modifications within the scope of the appended claims.

What we claim is:

1. A combination of a plastic sealing membrane and an adsorption layer in which said adsorption layer reduces permeability and extends functional lifespan of a plastic sealing membrane if a medium to be retained contains organic hydrocarbons in a gaseous and/or liquid phase, such adsorption layer being installed for retaining predominantly liquid or gaseous organic hydrocarbons prior to such matter reaching the plastic sealing membrane which is a sealing sheet of synthetic material; said adsorption layer comprising:
   a layer of activated carbon that is disposed, when viewed in the direction of flow of said matter that is to be retained, ahead of and upstream in relation to the direction of flow relative to said plastic sealing membrane.

2. An adsorption layer for retaining predominantly liquid or gaseous organic hydrocarbons prior to such matter reaching a sealing sheet of synthetic material; said adsorption layer comprises:
   a layer of activated carbon that is disposed, when viewed in the direction of flow of said matter that is to be retained, ahead of said sealing sheet;
   said layer of activated carbon being disposed directly on said sealing sheet.

3. An adsorption layer according to claim 2, in which said activated carbon is powdery.

4. An adsorption layer according to claim 2, in which said activated carbon is in the form of molded carbon particles.

5. An adsorption layer according to claim 2, in which said activated carbon is in the form of particles incorporated in sheets, and includes a binder to hold said particles together.

6. An adsorption layer according to claim 5, in which said binder is selected from the group consisting of synthetic resin on a polyurethane base, and coal tar.

7. An adsorption layer according to claim 2, in which said activated carbon is bonded to a carrier.

8. An adsorption layer according to claim 2, in which between said sealing sheet of synthetic material and said layer of activated carbon there is disposed at least a further layer collectively having double functions of ion exchange capacity whereby retention of heavy metal compounds is effected and also an adsorption of organic hydrocarbons is effected in said layer of activated carbon.

9. An adsorption layer according to claim 2, in which said activated carbon is mixed into a layer of another material.

10. An adsorption layer according to claim 9, in which said layer of another material is a layer of clay.

11. An adsorption layer according to claim 2, which includes a respective filter mat disposed on at least one surface of said layer of activated carbon.

12. An adsorption layer according to claim 2, in which said activated carbon is incorporated in a multi-layer sandwich sheet.

13. An adsorption layer according to claim 12, in which said sandwich sheet, when viewed in the direction of flow of said matter that is to be retained, has the following composition: a first sealing sheet of synthetic material, said layer of activated carbon, a second sealing sheet of synthetic material, a drainage grate, and a third sealing sheet of synthetic material.

14. An adsorption layer according to claim 2, in which said activated carbon is incorporated in a support grid that serves to transfer force.

15. An adsorption layer according to claim 2, in which said activated carbon is incorporated into mats that can be rolled out.

16. An adsorption layer for retaining predominantly liquid or gaseous organic hydrocarbons prior to such matter reaching a sealing sheet of synthetic material; said adsorption layer comprises:
   a layer of activated carbon that is disposed, when viewed in the direction of flow of said matter that is to be retained, ahead of said sealing sheet;
   said layer of activated carbon being disposed directly on said sealing sheet and being covered by a second sealing sheet of synthetic material, so that said layer of activated carbon is sandwiched between two sealing sheets.

* * * * *